US009889865B2

(12) United States Patent
Asano et al.

(10) Patent No.: US 9,889,865 B2
(45) Date of Patent: Feb. 13, 2018

(54) BRAKE CYLINDER DEVICE AND DISC BRAKE DEVICE

(71) Applicant: NABTESCO CORPORATION, Tokyo (JP)

(72) Inventors: Yoshio Asano, Kobe (JP); Hideyuki Oie, Kobe (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 14/908,186

(22) PCT Filed: Aug. 5, 2014

(86) PCT No.: PCT/JP2014/070644
§ 371 (c)(1),
(2) Date: Jan. 28, 2016

(87) PCT Pub. No.: WO2015/020063
PCT Pub. Date: Feb. 12, 2015

(65) Prior Publication Data
US 2016/0167682 A1     Jun. 16, 2016

(30) Foreign Application Priority Data
Aug. 6, 2013   (JP) .................................. 2013-163036

(51) Int. Cl.
*F16D 65/28* (2006.01)
*B61H 5/00* (2006.01)
(Continued)

(52) U.S. Cl.
CPC .............. *B61H 5/00* (2013.01); *B60T 17/083* (2013.01); *B61H 13/00* (2013.01); *B61H 13/005* (2013.01);
(Continued)

(58) Field of Classification Search
CPC   B60T 1/04; B60T 17/086; B61H 1/00; B61H 15/00; B61H 5/00; F16D 49/00;
(Continued)

(56) References Cited

U.S. PATENT DOCUMENTS 3,986,584 A * 10/1976 Wright ..................... B61H 5/00
                                                188/170
6,276,497 B1    8/2001 Severinsson
(Continued)

FOREIGN PATENT DOCUMENTS

EP        2 037 146 A2    3/2009
JP        2001-521468 A   11/2001
(Continued)

OTHER PUBLICATIONS

International Preliminary Report on Patentability and the Written Opinion of the International Searching Authority as issued in International Patent Application No. PCT/JP2014/070644, dated Feb. 9, 2016,.

(Continued)

*Primary Examiner* — Christopher Schwartz
(74) *Attorney, Agent, or Firm* — Pillsbury Winthrop Shaw Pittman, LLP

(57) ABSTRACT

The present disclosure increases the braking force of a parking spring brake mechanism without enlarging a device and without substantial increase in cost. The subject of the present disclosure is a brake cylinder device provided with a parking spring brake mechanism wherein a first piston moves in a prescribed braking direction. The brake cylinder device is provided with a brake force transmitting section having an inclined surface 38 that is inclined so as to press a brake output section in an advancement direction by moving along with the first piston in the braking direction. The inclined surface includes a first inclined surface pro- (Continued)

vided in a distal end portion, and a second inclined surface provided in a proximal end portion and inclined more than the first inclined surface with respect to the advancement direction.

8 Claims, 11 Drawing Sheets

(51) Int. Cl.
    *F16D 55/224* (2006.01)
    *B61H 13/00* (2006.01)
    *F16D 55/2255* (2006.01)
    *F16D 65/18* (2006.01)
    *F16D 65/40* (2006.01)
    *B60T 17/08* (2006.01)
    *F16D 65/56* (2006.01)
    *F16D 123/00* (2012.01)
    *F16D 125/66* (2012.01)
    *F16D 121/06* (2012.01)
    *F16D 127/06* (2012.01)

(52) U.S. Cl.
    CPC ..... *F16D 55/2245* (2013.01); *F16D 55/2255* (2013.01); *F16D 65/18* (2013.01); *F16D 65/40* (2013.01); *F16D 65/56* (2013.01); *F16D 2121/06* (2013.01); *F16D 2123/00* (2013.01); *F16D 2125/66* (2013.01); *F16D 2127/06* (2013.01)

(58) Field of Classification Search
    CPC ... F16D 65/56; F16D 55/2245; F16D 55/2255
    USPC .......... 188/72.7, 72.8, 106 F, 166, 167, 170, 188/173, 343
    See application file for complete search history.

(56) References Cited

U.S. PATENT DOCUMENTS

| | | | |
|---|---|---|---|
| 6,994,191 B2* | 2/2006 | McCann | B60T 13/68 188/170 |
| 2004/0026186 A1* | 2/2004 | Murayama | F16D 65/18 188/72.7 |
| 2009/0183956 A1 | 7/2009 | Berliant | |
| 2013/0098719 A1 | 4/2013 | Furutani | |
| 2016/0144843 A1* | 5/2016 | Asano | B60T 1/005 188/72.8 |

FOREIGN PATENT DOCUMENTS

| | | |
|---|---|---|
| JP | 2002-227894 A | 8/2002 |
| JP | 2010-164193 A | 7/2010 |
| JP | 2011-137481 A | 7/2011 |
| JP | 2013-087877 A | 5/2013 |

OTHER PUBLICATIONS

International Search Report as issued in International Patent Application No. PCT/JP2014/070644, dated Oct. 21, 2014.
Extended European Search Report as issued in European Patent Application No. 14834374.2, dated Mar. 8, 2017.

* cited by examiner

BRAKE CYLINDER DEVICE AND DISC BRAKE DEVICE

CROSS-REFERENCE TO RELATED APPLICATIONS

This application is the U.S. National Stage of PCT/JP2014/070644, filed Aug. 5, 2014, which in turn claims priority to Japanese Patent Application No. JP 2013-163036, filed Aug. 6, 2013. The contents of these applications are incorporated herein by reference in their entireties.

TECHNICAL FIELD

The present disclosure relates to a brake cylinder device in which a parking spring brake mechanism used for parking a railway vehicle can operate, and a disc brake device having the brake cylinder device.

BACKGROUND

There has been conventionally known a brake cylinder device in which a parking spring brake mechanism can operate, as a brake cylinder device used in a brake device for a railway vehicle. For example, Patent Literature 1 discloses a unit brake (a brake cylinder device) provided with a wedge (a brake force transmitting section) that transmits a moving force of a piston to a push-rod (brake output section) via an inclined surface. In this arrangement, a pressurized fluid is discharged from a pressure chamber, and the brake output section is pressed by the brake force transmitting section due to a biasing force of a spring, such that a spring brake means (a parking spring brake mechanism) outputs a brake force.

RELEVANT REFERENCES

Patent Literature

Patent Literature 1: Japanese Patent Application Publication NO. 2010-164193

SUMMARY

In a brake cylinder device disclosed in Patent Literature 1, an attempt to increase the brake force of the parking spring brake mechanism produces the following problems. Specifically, a possible way to increase a brake force of the parking spring brake mechanism is to change the substance or the diameter of the spring for increasing the spring force. However, there is a limit to increase the spring force by such design changes. To obtain a desired brake force, it may be necessary to increase the size of the parking spring brake mechanism. This may cause problems such as increase in the size of the brake cylinder device or significant increase in costs.

The present disclosure is intended to overcome the above problems. The purpose of the present disclosure is to increase the brake force of a parking spring brake mechanism without enlarging a device and without significant increase in cost.

(1) To overcome the above discussed problem, a brake cylinder device according to an aspect of the present disclosure comprises: a parking spring brake mechanism for parking a vehicle, wherein a first piston installed in a first cylinder section travels in a predetermined braking direction due to a biasing force of a first spring installed in the first cylinder section; a brake output section capable of advancing and withdrawing along a direction intersecting the braking direction; and a brake force transmitting section having an inclined surface inclined so as to press the brake output section in an advancement direction by traveling in the braking direction along with the first piston, wherein the inclined surface includes a first inclined surface provided in a distal end portion of the brake force transmitting section, and a second inclined surface provided in a proximal end portion of the brake force transmitting section and inclined more than the first inclined surface with respect to the advancement direction.

In this arrangement, the brake force transmitting section travels in the braking direction as the first piston travels in the braking direction. Simultaneously, the inclined portion formed in the brake force transmitting section may press the brake output section, and thus the brake output section may be moved in the advancement direction to produce a brake force.

In this arrangement, the first inclined portion having a smaller inclination angle with respect to the advancement direction of the brake output section may press the brake output section when the brake force transmitting section starts moving in the braking direction. Thus, the traveling distance of the brake output section in the advancement direction may be made large relative to the traveling distance of the brake force transmitting section in the braking direction.

In this arrangement, the second inclined portion having a larger inclination angle than the first inclined portion with respect to the advancement direction of the brake output section may press the brake output section when the brake force is outputted to the object to be braked. Thus, the brake force outputted from the brake output section can be made larger.

That is, in this arrangement, a large brake force can be produced from the parking spring brake mechanism by only changing the shape of the inclined portion of the brake force transmitting section, unlike the conventional arts. To obtain a large brake force, there is no need of changing the substance or diameter of the spring and changing the shape of the cylinder in accordance with the design modification of the spring.

Accordingly, in this arrangement, the brake force of the parking spring brake mechanism can be made larger without increase in the size of the device or significant increase in costs.

(2) More preferably, the first inclined surface and the second inclined surface are constituted by planar surfaces.

In this arrangement, the traveling distance of the brake output section in the advancement direction may be linear with the traveling distance of the brake force transmitting section in the braking direction. As a result, the pneumatic control for producing a desired brake force becomes simple.

(3) More preferably, the brake cylinder device further comprises: a fluid brake mechanism wherein a second piston installed in a second cylinder section travels in the braking direction; and a transmission mechanism configured to transmit a biasing force of the first piston in the braking direction to the second piston or a shaft section to be displaced along with the second piston, wherein the fluid brake mechanism is formed of a member separate from the second cylinder section and contained in the second cylinder section, and the fluid brake mechanism further includes an internal cylinder member having a cylindrical shape, wherein the second piston slides on an inner circumferential surface of the internal cylinder member.

This arrangement provides a brake cylinder device in which both a fluid brake mechanism used in running a railway vehicle and a parking spring brake mechanism used for parking a railway vehicle can operate.

In the brake cylinder device in which both the fluid brake mechanism and the parking spring brake mechanism can operate, the inclined portion of the brake force transmitting section configured as described above can increase the brake force produced by the parking spring brake mechanism. Also, this arrangement unintentionally increases the brake force produced by the fluid brake mechanism, if the control of the flowing air remains unchanged. However, it is expected that there is a market demand to maintain the brake force of the fluid brake mechanism at the same level as in the conventional arts by keeping the control of the fluid pressure unchanged.

In this arrangement, an internal cylinder member having a cylindrical shape may be contained in the second cylinder section of the fluid brake mechanism. Thus, the cylinder of the fluid brake mechanism may have a substantially smaller bore diameter. Thus, the second piston of the fluid brake mechanism may be acted on by a smaller force. Therefore, the brake force produced by the fluid brake mechanism can be maintained at the conventional level without changing the control of the pressurized fluid for controlling the fluid brake mechanism.

(4) More preferably, the brake output section includes: a sleeve member formed of a cylindrical member having an axis along the advancement direction; and a shaft member configured to travel in the advancement direction relative to the sleeve member when the sleeve member is rotated in a predetermined direction, and the brake cylinder device further comprises a gap adjusting mechanism including: a ratchet mechanism having a ratchet gear configured to rotate integrally with the sleeve member and a ratchet pawl configured to mesh with teeth of the ratchet gear; a link mechanism having a first link member connected to the ratchet pawl at one end thereof, wherein the ratchet pawl is configured to travel in a direction opposite to the predetermined direction and mesh with the teeth when a pressed section provided on the other end of the first link member or a second link member swingably connected to the other end of the first link member at one end thereof is pressed for a predetermined distance or more; and a link pressing mechanism configured to press the pressed section so as to move the ratchet pawl in a direction opposite to the predetermined direction.

This arrangement allows automatic adjustment of the gaps (hereinafter also referred to as "pad gaps") between the object to be braked by the brake cylinder device and parts (e.g., the brake pads) of the brake output section traveling in the advancement direction and urged against the object to be braked. More specifically, in this arrangement, the brake output section may be constituted by two members (the sleeve member and the shaft member) capable of traveling relative to each other along the advancement direction of the brake output section; and when the pad gaps become large, the shaft member is advanced relative to the sleeve member so as to reduce the pad gaps automatically.

More specifically, in this arrangement, when the pad gaps become large, the brake output section may be advanced largely in the advancement direction, and thus the pressed section provided in the link mechanism may be pressed largely by the link pressing mechanism. When the pressed section is pressed for a predetermined distance or more, the ratchet pawl may travel in a direction opposite to the predetermined direction and mesh with the teeth of the ratchet gear rotating integrally with the sleeve member.

Then, when the brake is released and the brake output section travels in the withdrawal direction, the link pressing mechanism may cease to press the pressed section; and then the ratchet gear may be rotated in the predetermined direction. As a result, the shaft member may travel in the advancement direction relative to the sleeve member, reducing the pad gaps.

(5) More preferably, the link pressing mechanism includes: a lever member formed so as to be swingable around a proximal end portion thereof, wherein an application portion between the proximal end portion and a distal end portion is pressed such that the distal end portion presses the pressed section; and a pressing section provided on a member fixed on or integrated with the first cylinder section and configured to press the application portion traveling in accordance with the traveling of the brake output section in the advancement direction.

In this arrangement, the link pressing mechanism for pressing the pressed section may be constituted by a lever mechanism. More specifically, a lever member has a proximal end portion serving as a fulcrum and provided so as to be swingable. The distal end portion of the lever member is provided as a working portion for pressing the pressed section. The pressed section is pressed when the pressing section presses the portion provided as an application portion between the fulcrum and the working portion. Thus, the pressed section can be sufficiently displaced even when the traveling distance of the brake output section achieved after the pressing section contacts the application portion of the lever member is small. Thus, the pad gaps being slightly larger can be reduced.

(6) More preferably, the application portion has a recess into which the pressing section is to be fitted.

In this arrangement, the pressing section may press the lever member while the pressing section is fitted in the recess formed in the application portion; therefore, it can be ensured that the pressing section presses the lever member.

(7) More preferably, a portion of the lever member between the application portion and the distal end portion is bent to the pressed section side relative to a direction in which a portion of the lever member between the proximal end portion and the application portion extends.

In this arrangement, the force from the pressing section acting on the application portion can be transmitted to the pressed section more efficiently.

(8) To overcome the above discussed problem, a disc brake device according to an aspect of the present disclosure comprises: any of the brake cylinder devices described above; and a caliper body equipped with the brake cylinder device and mounted on a vehicle, wherein when the brake cylinder device operates, a pair of brake pads mounted on the caliper body nips a disc on a wheel axle to be braked, so as to produce a brake force.

In this arrangement, the disc brake device may include the brake cylinder device that can increase the brake force of the parking spring brake mechanism without increase in the size of the device or significant increase in costs. Accordingly, a disc brake device that is cost effective and compact can be provided.

In the present disclosure, the brake force of the parking spring brake mechanism can be made larger without increase in the size of the device or significant increase in costs.

DESCRIPTION OF EXAMPLE EMBODIMENTS

The embodiments of the present disclosure will now be described with reference to the drawings. Embodiments of the present disclosure can be widely applied as a brake cylinder device and a disc brake device for a railway vehicle.

(Entire Configuration of Disc Brake Device)

Figure 1:
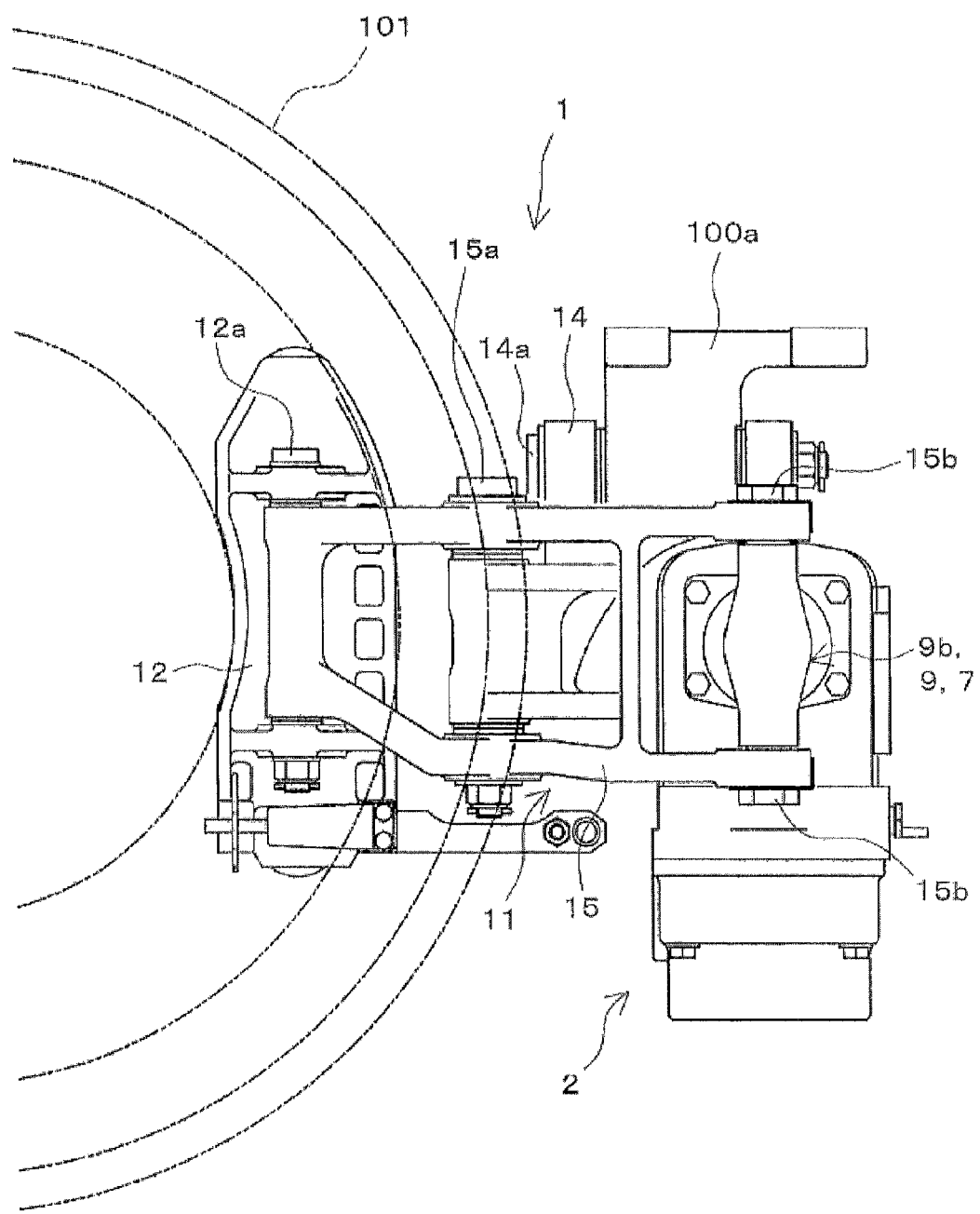
FIG. 1 is a side view of a disc brake device having a brake cylinder device for railway vehicles according to an embodiment of the present disclosure.
Figure 2:
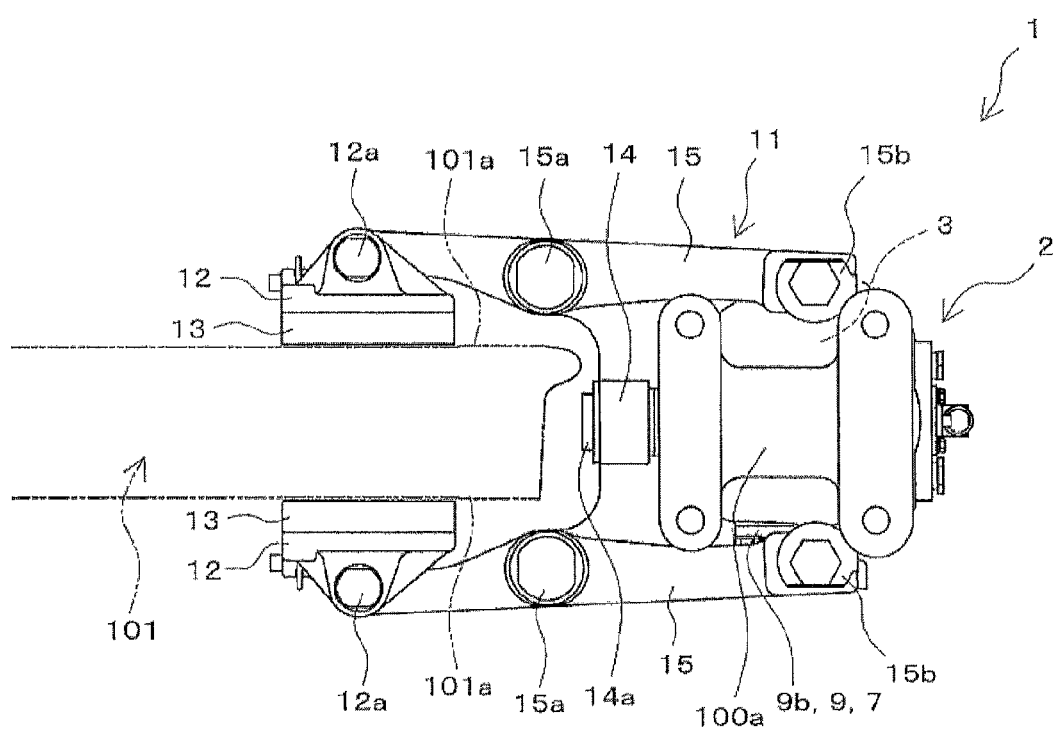
FIG. 2 is a plain view of the disc brake device shown in FIG. 1.

FIG. 1 is a side view of a disc brake device 1 as viewed from the direction of the wheel axle, the disc brake device 1 having a brake cylinder device 2 for railway vehicles according to an embodiment of the present disclosure. FIG. 2 is a plain view of the disc brake device 1 shown in FIG. 1 as viewed from above. The disc brake device 1 shown in FIGS. 1 and 2 may include a brake cylinder device 2, a caliper body 11 equipped with the brake cylinder device 2 and mounted on the vehicle body (not shown) so as to be relatively displaceable in the wheel axle direction, and a pair of back plates 12, 12 serving as brake shoe retainers for retaining a pair of brake pads 13, 13 as brake shoes.

The caliper body 11 may include a coupling member 14 and a pair of brake levers 15, 15. The coupling member 14 may be mounted on a bracket 100a fixed on the bottom surface of the vehicle body, via a swing pin 14a so as to be swingable around the axis parallel to the traveling direction of the vehicle. On the coupling member 14, the pair of brake levers 15, 15 may be provided substantially symmetrically via a pair of fulcrum pins 15a so as to be swingable. The fulcrum pins 15a may be arranged to extend orthogonally to the axial direction of the swing pin 14a as viewed from the direction of the rotation axis of the brake disc 101.

On one end of the pair of brake levers 15, 15, the brake cylinder device 2 may be mounted via support pins 15b; and the brake cylinder device 2 may drive the one end. On the other end of the pair of brake levers 15, 15 supported by the fulcrum pins 15a, opposite to the one end on which the brake cylinder device 2 is mounted, the pair of back plates 12, 12 for retaining brake pads 13 may be mounted. The back plates 12 may be mounted on the brake levers 15 so as to be swingable, via support pins 12a extending in parallel to the support pin 15a. Therefore, the pair of brake levers 15, 15 may support the brake pads 13 via the back plates 12.

In the above disc brake device 1, a housing 3 of the brake cylinder device 2 may be mounted on one of the brake levers 15, and a brake output section 7 may be mounted on the other of the brake levers 15, as will be described later. Further, in the disc brake device 1, the operation of the brake cylinder device 2 may cause the brake output section 7 to advance relative to the housing 3 (e.g., move away from the housing 3) or withdraw relative to the housing 3 (e.g., approach the housing 3). Thus, the portions of the pair of brake levers 15, 15 near the support pins 15b may be driven to move away from or move closer to each other.

When driven as above, the pair of brake levers 15, 15 of the disc brake device 1 may operate with the fulcrum pins 15a serving as a spindle, so as to nip the brake disc 101 (the object of braking) between the brake pads 13. In this operation, one of the brake pads 13 provided on one of the pair of brake levers 15, 15 may first contact the brake surface 101a of the brake disc 101. Further, the other brake lever 15 may urge the other brake pad 13 onto the brake surface 101a of the brake disc 101 by using the reaction force received from the one brake pad 13 contacting the brake surface 101a. Thus, the brake disk 101 may be nipped by the pair of brake pads 13, 13; and the friction force produced between the brake pads 13, 13 and the brake surfaces 101a, 101a may brake the rotation of the brake disc 101 and brake the rotation of the wheels (not shown) of the railway vehicle coaxial with the brake disc 101.

(Configuration of Brake Cylinder Device)

Figure 3:
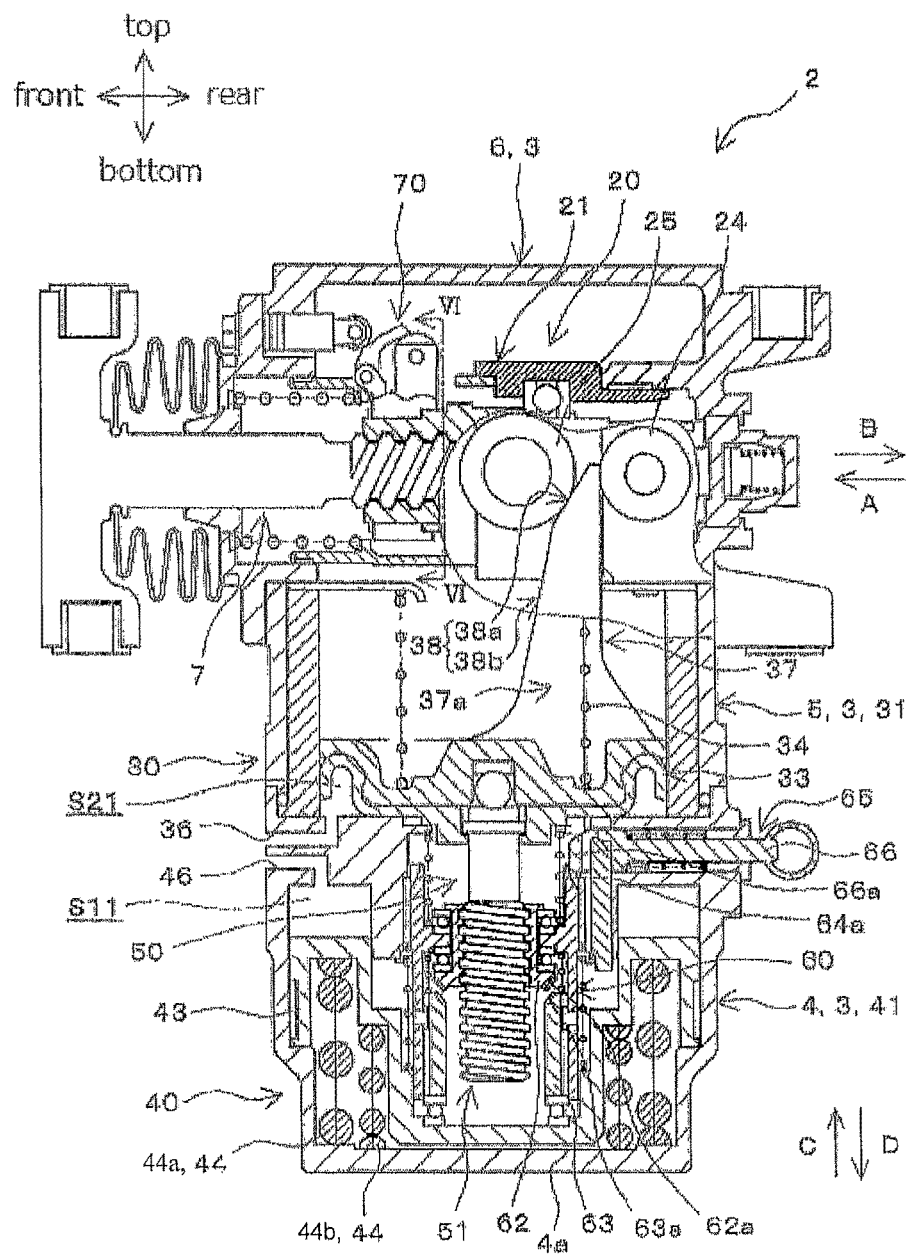
FIG. 3 is a longitudinal sectional view of the brake cylinder device for railway vehicles according to an embodiment of the present disclosure.
Figure 4:
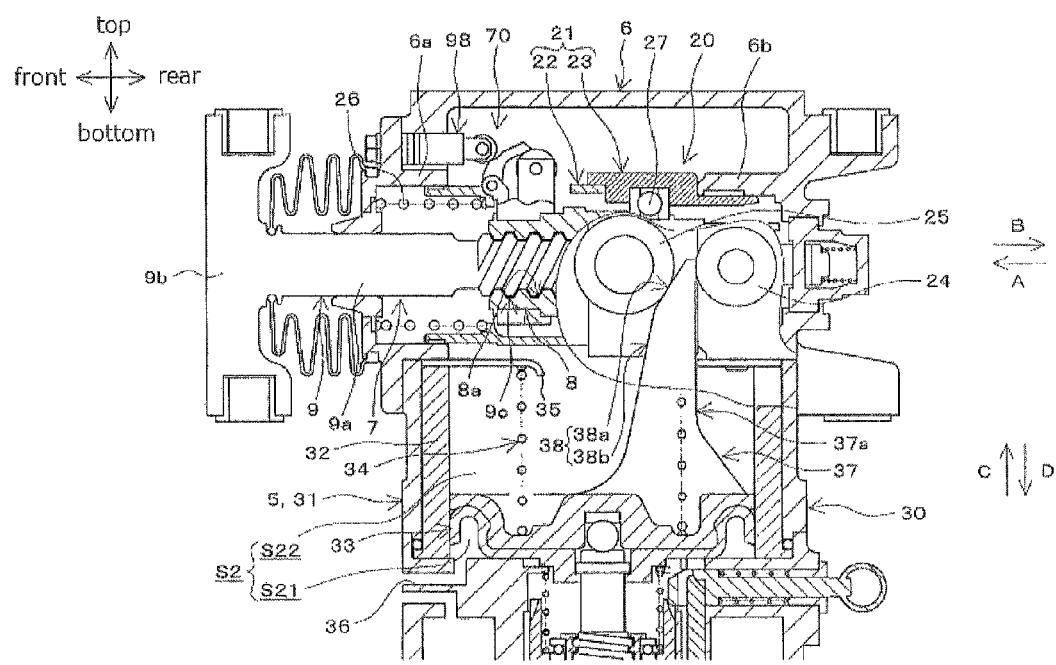
FIG. 4 is an enlarged view of a part around a fluid brake mechanism shown in FIG. 3.
Figure 5:
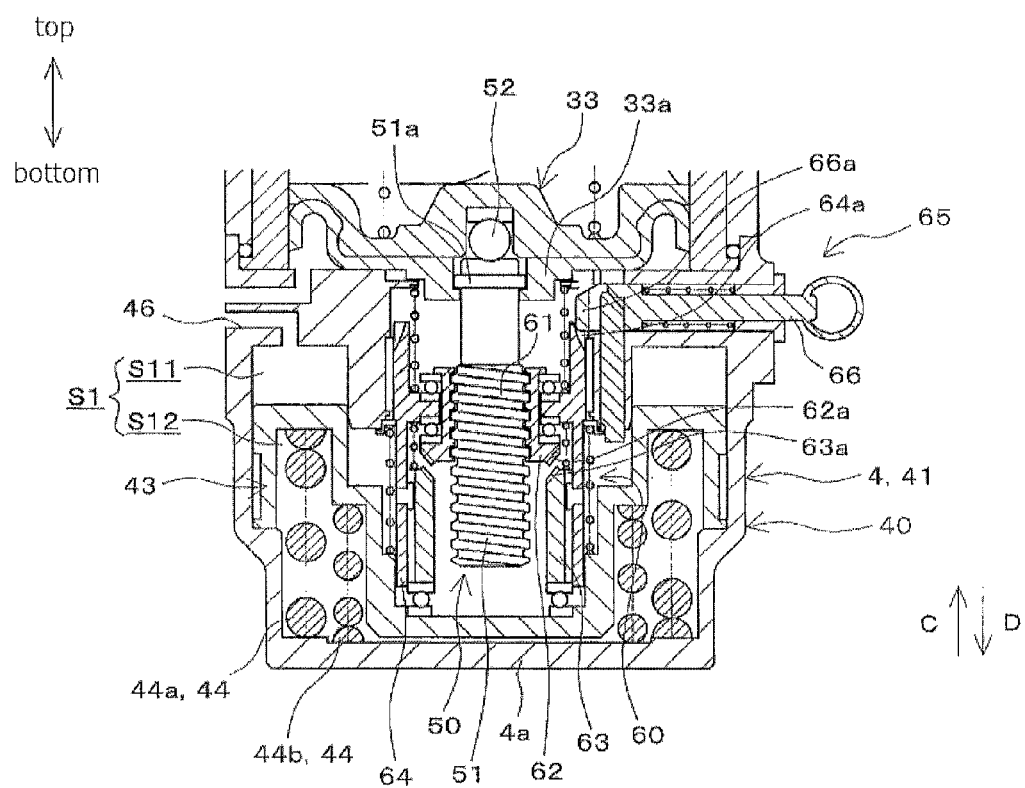
FIG. 5 is an enlarged view of a part around a parking spring brake mechanism shown in FIG. 3.

Next, the brake cylinder device 2 according to the embodiments of the present disclosure will now be described. FIG. 3 is a longitudinal sectional view of the brake cylinder device 2. FIGS. 4 and 5 are enlarged views of portions of FIG. 3. The brake cylinder device 2 may include the housing 3, the brake output section 7, a brake output section supporting mechanism 20, a fluid brake mechanism 30, a parking spring brake mechanism 40, a shaft section 50, a transmission mechanism 60, a lock mechanism 65, and a gap adjusting mechanism 70. For convenience in the descriptions below, the direction indicated by the arrow denoted as "top" is referred to with the words "above" or "up," the direction indicated by the arrow denoted as "bottom" is referred to with the words "under" or "down," the direction indicated by the arrow denoted as "front" is referred to with the word "front," and the direction indicated by the arrow denoted as "rear" is referred to with the word "rear."

(Housing)

As shown in FIG. 3, the housing 3 may include three housing sections (a first housing section 4, a second housing section 5, and a third housing section 6), which may be combined to form a case. In the housing 3, the first housing section 4, the second housing section 5, and the third housing section 6 may be arranged in this order from the bottom to the top.

As shown in FIG. 5, the first housing section 4 may be formed in a substantially cylindrical shape with a bottom section 4a at the bottom, and may house a first piston 43, a first spring 44, etc. (described later).

As shown in FIG. 4, the second housing section 5 may be formed in a substantially cylindrical shape with openings at the top and bottom thereof, and may house a second piston 33, a second spring 34, a cylinder liner 32 (an inner cylinder), etc.

The third housing section 6 may be formed in a casing shape with openings at the front and bottom thereof, and may house a portion of the brake output section 7, the brake output section supporting mechanism 20, the gap adjusting mechanism 70, etc. In the front portion inside the third housing section 6, there may be formed a front cylindrical wall 6a having a cylindrical shape and slightly extending rearward from the front wall of the third housing section 6. On the other hand, in the rear portion inside the third housing section 6, there may be formed a rear cylindrical wall 6b having a cylindrical shape and slightly extending forward from the rear wall of the third housing section 6.

(Brake Output Section)

As shown in FIG. 4, etc., the brake output section 7 may be provided so as to extend in the front-rear direction, and the rear portion thereof may be housed in the third housing section 6, while the front end portion thereof may project forward through the opening formed in the front portion of the third housing section 6. The brake output section 7 may include a sleeve member 8 and a push-rod 9 (or a shaft member).

The sleeve member 8 may be formed of a cylindrical member arranged such that the axis thereof extends in the front-rear direction. In the inner circumferential surface of the sleeve member 8, there is formed an internal thread 8a.

The push-rod 9 may include a rod section 9a formed in a rod shape and an output end 9b formed on the front end of the rod section 9a; and the rod section 9a and the output end 9b may be integrated together into a single structure or member. On the rear end of the rod section 9a, there may be formed an external thread 9c screwed in the internal thread 8a of the sleeve member 8. The output end 9b may have a predetermined thickness in the front-rear direction and may be provided so as to extend in the top-bottom direction. The upper end and the lower end of the output end 9b may be attached to the brake levers 15, 15 via the support pins 15b, 15b, respectively (see FIG. 1). Thus, the push-rod 9 may be restricted from rotating with respect to the housing 3.

(Brake Output Section Supporting Mechanism)

As stated above, the brake output section supporting mechanism 20 may be housed in the third housing section 6. The brake output section supporting mechanism 20 may support the brake output section 7 such that the brake output section 7 is capable of advancing and withdrawing in the front-rear direction with respect to the housing 3. The brake output section supporting mechanism 20 may include a case 21, a fixed roller 24, a movable roller 25, a return spring 26, etc.

The case 21 may include a front case 22 and a rear case 23. Both the cases 22, 23 may have substantially cylindrical shapes. The case 21 may extend in the front-rear direction with the front case 22 fitted into the front portion of the rear case 23. The front end of the case 21 may be slidably inserted into the inner wall of the front cylindrical wall 6a of the third housing section 6, while the rear end of the case 21 may be slidably inserted into the inner wall of the rear cylindrical wall 6b of the third housing section 6. Thus, the case 21 can be displaced in the front-rear direction with respect to the housing 3.

Inside the case 21, the sleeve member 8 may be mounted on the rear case 23 via a thrust bearing 27 fitted into the inner circumferential surface of the rear case 23, so as to be coaxial with the case 21. Thus, the sleeve member 8 may be restricted from moving in the front-rear direction with respect to the case 21 but can rotate freely with respect to the case 21.

The fixed roller 24, which may have a cylindrical shape, may be at a fixed position relative to the housing 3 and may be rotatably supported by the third housing section 6. For example, a pair of fixed rollers 24 may be provided on both sides of the case 21 in a direction orthogonal to the axial direction of the case 21 which is parallel to the axial direction of the brake output section 7.

The movable roller 25, which may have a cylindrical shape, may be rotatably supported outside the wall of the case 21. For example, a pair of movable rollers 25 may be provided on both sides of the case 21 in a direction orthogonal to the axial direction of the case 21. Each of the movable rollers 25 may be positioned such that the outer circumference thereof may be faced with the associated fixed roller 24 at a distance.

Further, the movable rollers 25 may be supported such that they can be displaced relative to the housing 3 by rolling during rotation. The housing 3 may be provided with a guide (not shown) that allows the movable rollers 25 to roll along the direction substantially parallel to the axial direction of the brake output section 7.

The return spring 26 may be provided as a coil spring. One end of the return spring 26 may contact the step inside the third housing section 6, and the other end of the return spring 26 may contact the step inside the case 21. The return spring 26 may be compressed.

The return spring 26, which is installed as above, may be configured to bias the case 21 along the direction substantially parallel to the axial direction of the brake output section 7 so as to withdraw the case 21 into the housing 3 (e.g., the direction of arrow B in FIGS. 3 and 4). Since the return spring 26 biases the case 21 in the withdrawal direction B, the brake output section 7 may also be biased in the withdrawal direction B along with the case 21. Due to the biasing force of the return spring 26, the brake output section 7 may be moved in the direction to withdraw into the housing 3 when the brake force transmitting section 37 (described later) is displaced upon release of the brake force by the brake cylinder device 2

When the second piston 33 and the brake force transmitting section 37 move in a braking direction toward the brake output section supporting mechanism 20 (e.g., the direction of the arrow C in FIGS. 3 and 4) upon output of brake force by the brake cylinder device 2, the fixed rollers 24 and the movable rollers 25 may operate as follows. More specifically, the fixed rollers 24 may rotate at the same position with respect to the housing 3, while the movable rollers 25 may be biased toward the advancement direction A of the brake force transmitting section 37 (e.g., the direction of the arrow A in FIGS. 3 and 4).

Thus, the movable rollers 25 may move relatively toward the advancement direction A while rotating and rolling with respect to the housing 3. That is, when the brake force transmitting section 37 moves, the movable rollers 25 may be driven such that the wedge 37a of the brake force transmitting section 37 enlarges the distance between the fixed rollers 24 and the movable rollers 25. Further, the case 21 and the brake output section 7 may move toward the advancement direction A along with the movable rollers 25. Thus, the pair of brake pads 13 may move close to each other to nip and retain the brake disc 101. Thus, the rotation of the wheel may be braked.

(Fluid Brake Mechanism)

The fluid brake mechanism 30 may be operated by supply and exhaust of compressed air as a pressurized fluid. The fluid brake mechanism 30 may be used for brake operation during running of a railway vehicle. The fluid brake mechanism 30 may include a second cylinder section 31 constituted by a second housing section 5, a cylinder liner 32, a second piston 33, a second spring 34, and a second pressure chamber S21.

The cylinder liner 32 may be a wall formed in a cylindrical shape and having a predetermined thickness and may be fitted inside the second cylinder section 31.

The second piston 33 may be a disc-like member formed in a substantially circular shape in a planar view. The second piston 33 may be formed such that the outer circumferential edge thereof has a diameter slightly smaller than the inner diameter of the cylinder liner 32. The second piston 33 may be placed in the cylinder liner 32 so as to be capable of advancing and withdrawing with respect to the inner circumferential surface of the cylinder liner 32. The second piston 33 may partition the second space S2 in the cylinder liner 32 into a second pressure chamber S21 under the second piston 33 (on the parking spring brake mechanism 40 side) and a second spring housing space S22 above the second piston 33 (on the brake output section 7 side).

The brake force transmitting section 37 may be fixed on the second piston 33. In the part of the second piston 33 on the second spring housing space S22 side, the brake force transmitting section 37 may extend from the second piston 33 toward the brake output section 7. The shape of the brake force transmitting section 37 will be described later.

The second spring 34 may be a coil spring housed in the second spring housing space S22. More specifically, one end of the second spring 34 may contact the second piston 33, and the other end thereof may contact a spring bearing plate 35 fixed on the housing 3. Thus, the second spring 34 may bias the second piston 33 against the housing 3 in a brake releasing direction (e.g., the direction of the arrow D in FIGS. 3 and 4) which is opposite to the braking direction.

The second pressure chamber S21 may be a space within the second space S2 on the parking spring brake mechanism 40 side of the second piston 33. The second pressure chamber S21 may be provided with a second supply/exhaust port 36 for supplying and exhausting compressed air (pressurized fluid) to and from the second pressure chamber S21.

(Shape of Brake Force Transmitting Section)

The brake force transmitting section 37 may be constituted by a wedge 37a having a tabular shape. The proximal end of the wedge 37a may be fixed on the second piston 33, and the distal end thereof, which is narrower toward the tip, may extend toward the braking direction C.

The brake force transmitting section 37 may include an inclined surface 38 (inclined portion) on the front side thereof. The inclined surface 38 may be inclined with respect to the advancement direction A of the brake output section 7.

The inclined surface 38 may include a first inclined surface 38a (first inclined portion) and a second inclined surface 38b (second inclined portion). The first inclined surface 38a may be in the distal end portion of the inclined surface 38 (in the braking direction C), and the second inclined surface 38b may be in the proximal end portion of the inclined surface 38 (in the brake releasing direction D). The second inclined surface 38b may be inclined at a larger angle (about 80° in the embodiment) than the first inclined surface 38a which is inclined at a predetermined angle (about 60° in the embodiment) with respect to the advancement direction A.

When the second piston 33 and the brake force transmitting section 37 move in the braking direction C upon output of the brake force by the brake cylinder device 2, the movable rollers 25 may be pressed gradually in the advancement direction A by the inclined surface 38 of the brake force transmitting section 37. The brake output section 7 may move gradually in the advancement direction A. Thus, the force to move the second piston 33 in the braking direction C may be converted into the force to move the brake output section 7 in the advancement direction A which may intersect the braking direction C.

In the disc brake device 1, the gaps between the brake pads 13 and the brake disc 101 (hereinafter also referred to as "pad gaps") may be preset such that while the brake output section 7 is pressed by the second inclined surface 38b, the pair of brake pads 13, 13 may nip and retain the brake disc 101. That is, while the brake output section 7 is pressed by the first inclined surface 38a, the pair of brake pads 13, 13 may not nip and retain the brake disc 101.

(Parking Spring Brake Mechanism)

The parking spring brake mechanism 40 may be a parking brake mechanism used to keep the braked state of the parked railway vehicle. As shown in FIG. 5, the parking spring brake mechanism 40 may include a first cylinder section 41 constituted by a first housing section 4, a first piston 43, a first spring 44, and a first pressure chamber S11.

The first piston 43 may be placed in the first cylinder section 41 so as to be able to reciprocate in parallel to the axis thereof and slide on the inner wall of the first cylinder section 41. The first piston 43 may be provided so as to be movable in the same directions as the second piston 33 (the directions of the arrows C and D in FIG. 5). The first piston 43 may partition the first space S1 in the first cylinder section 41 into a first pressure chamber S11 above the first piston 43 and a first spring housing space S12 under the first piston 43.

The first spring 44 may be a coil spring housed in the first spring housing space S12. More specifically, one end of the first spring 44 may contact the first piston 43, and the other end thereof may contact the bottom section 4a of the first housing section 4. Thus, the first spring 44 may bias the first piston 43 upward (in the braking direction C) against the housing 3. In this embodiment, the first spring 44 may be constituted by a first outer spring 44a and a first inner spring 44b. These two springs 44a, 44b may be positioned concentrically such that the first outer spring 44a lies outside the first inner spring 44b.

The first pressure chamber S11 may be a space within the first space S1 on the fluid brake mechanism 30 side of the first piston 43. The first pressure chamber S11 may be provided with a first supply/exhaust port 46 for supplying and exhausting compressed air (pressurized fluid) to and from the first pressure chamber S11.

With such an arrangement, when the first supply/exhaust port 46 supplies compressed air to the first pressure chamber S11, the first piston 43 may be moved in the brake releasing direction D against the biasing force produced by elastic recovery of the first spring 44 being compressed. On the other hand, when the compressed air supplied into the first pressure chamber S11 is exhausted through the first supply/exhaust port 46, the first piston 43 may be moved in the braking direction C due to the biasing force of the first spring 44.

(Shaft Section)

As shown in FIG. 5, the shaft section 50 may include a spindle 51, a bearing 52, etc. The shaft section 50 may be connected to the second piston 33 at an end of the spindle 51 and configured to be displaced along with the second piston 33.

The spindle 51 may be positioned so as to project from the second piston 33 in the brake releasing direction D. The spindle 51 may be a shaft-like member separate from the second piston 33. The spindle 51 may be configured to transmit the biasing force from the parking spring brake mechanism 40 to the second piston 33 along with the transmission mechanism 60 (described later).

Further, at the end of the spindle 51 connected to the second piston 33, there is provided a projected step 51a extending circumferentially along the outer circumference. The radially central portion of the second piston 33 may have a recess. On the inner circumference of the recess, there may be provided a spindle retainer 33a having an edge shape and engaged with the step 51a. When the second piston 33 is moved in the braking direction C, the spindle retainer 33a in the second piston 33 may be engaged with the step 51a at the end of the spindle 51 and bias the spindle 51 in the braking direction C.

The bearing 52 may be, e.g., a ball-like member serving as a bearing for receiving a thrust load imparted on the spindle 51 by the biasing force from the parking spring brake mechanism 40. Further, the bearing 52 may be positioned in the above recess provided in the central portion of the second piston 33, and may be positioned between the end of the spindle 51 and the second piston 33 so as to contact both of them. The biasing force from the parking spring brake mechanism 40 may be transmitted to the second piston 33 via the transmission mechanism 60 (described later), spindle 51, and the bearing 52.

(Transmission Mechanism)

The transmission mechanism 60 may transmit the biasing force of the first piston 43 in the parking spring brake mechanism 40 to the shaft section 50 which is configured to be displaced along with the second piston 33. As shown in FIG. 5, the transmission mechanism 60 may include a screw 61, a clutch wheel 62, a clutch sleeve 63, a clutch box 64, etc. and may be positioned radially inside the first piston 43.

In the transmission mechanism 60, when the parking spring brake mechanism 40 operates, the clutch sleeve 63 may be moved in the braking direction along with the first piston 43, such that the indentation teeth 63a of the clutch sleeve 63 mesh with the indentation teeth 62a of the clutch wheel 62. The clutch wheel 62 may be restricted from rotating with respect to the housing 3, via the clutch box 64 and the clutch sleeve 63. Thus, the screw 61 formed in the spindle 51 may be prohibited from rotating with respect to the internal thread formed inside the clutch wheel 62, and the spindle 51 and the first piston 43 are connected together. Therefore, the brake force of the parking spring brake mechanism 40 may be transmitted to the wheel via the second piston 33, the brake force transmitting section 37, the brake output section 7, etc.

On the other hand, when the parking spring brake mechanism 40 is not operating, the indentation teeth 63a of the clutch sleeve 63 may not mesh with the indentation teeth 62a of the clutch wheel 62. Since the clutch wheel 62 can rotate freely with respect to the clutch box 64 (that is, the housing 3), the spindle 51 can move in the braking direction with respect to the transmission mechanism 60.

(Locking Mechanism)

The locking mechanism 65 may achieve the locking state by restricting the relative displacement of the spindle 51 with respect to the first piston 43 via the transmission mechanism 60 while keeping the parking spring brake mechanism 40 in operation. More specifically, as shown in FIG. 5, the locking mechanism 65 may include a substantially rod-like latch member 66 extending through the side wall of the housing 3. On the end of the latch member 66 (the end inside the housing 3), there may be provided an engagement blade 66a to be engaged with a latch blade 64a formed on the clutch box 64.

When the parking spring brake mechanism 40 operates in the state where the engagement blade 66a and the latch blade 64a are engaged with each other (the locking state), the brake force of the parking spring brake mechanism 40 may be transmitted to the wheel via the second piston 33, the brake force transmitting section 37, the brake output section 7, etc.

On the other hand, when the brake force of the parking spring brake mechanism 40 is imparted on the wheel, and the latch blade 64a is pulled outside the housing 3 to release the engagement between the engagement blade 66a and the latch blade 64a, the brake force of the parking spring brake mechanism 40 may not be transmitted to the wheel. More specifically, when the engagement between the engagement blade 66a and the latch blade 64a is released, the clutch wheel 62, the clutch sleeve 63, and the clutch box 64 engaged with one another may become free to rotate with respect to the housing 3. Thus, the spindle 51 may be allowed to rotate relative to the first piston 43. Therefore, due to the biasing force of the second spring 34 biasing the second piston 33, the spindle 51 may be moved in the brake releasing direction D along with the second piston 33. Further, in accordance with the movement of the spindle 51 in the brake releasing direction D, the clutch box 64, the clutch sleeve 63, and the clutch wheel 62 may rotate with respect to the housing 3. Thus, the movement of the spindle 51 in the brake releasing direction D may be allowed.

(Gap Adjusting Mechanism)

The gap adjusting mechanism 70 may adjust the pad gaps between the brake surface 101a of the brake disc 101 and the brake pads 13.

In general, a disc brake device may undergo reduction of brake force because the brake pads are urged against the brake disc and worn gradually.

To overcome this problem, the disc brake device 1 according to this embodiment may have the brake output section 7 constituted by two members (the sleeve member 8 and the push-rod 9); and the gap adjusting mechanism 70 may adjust the position (the amount of projection) of the push-rod 9 relative to the sleeve member 8, so as to adjust the gap between the brake pads 13 and the brake surface 101a.

Figure 6:
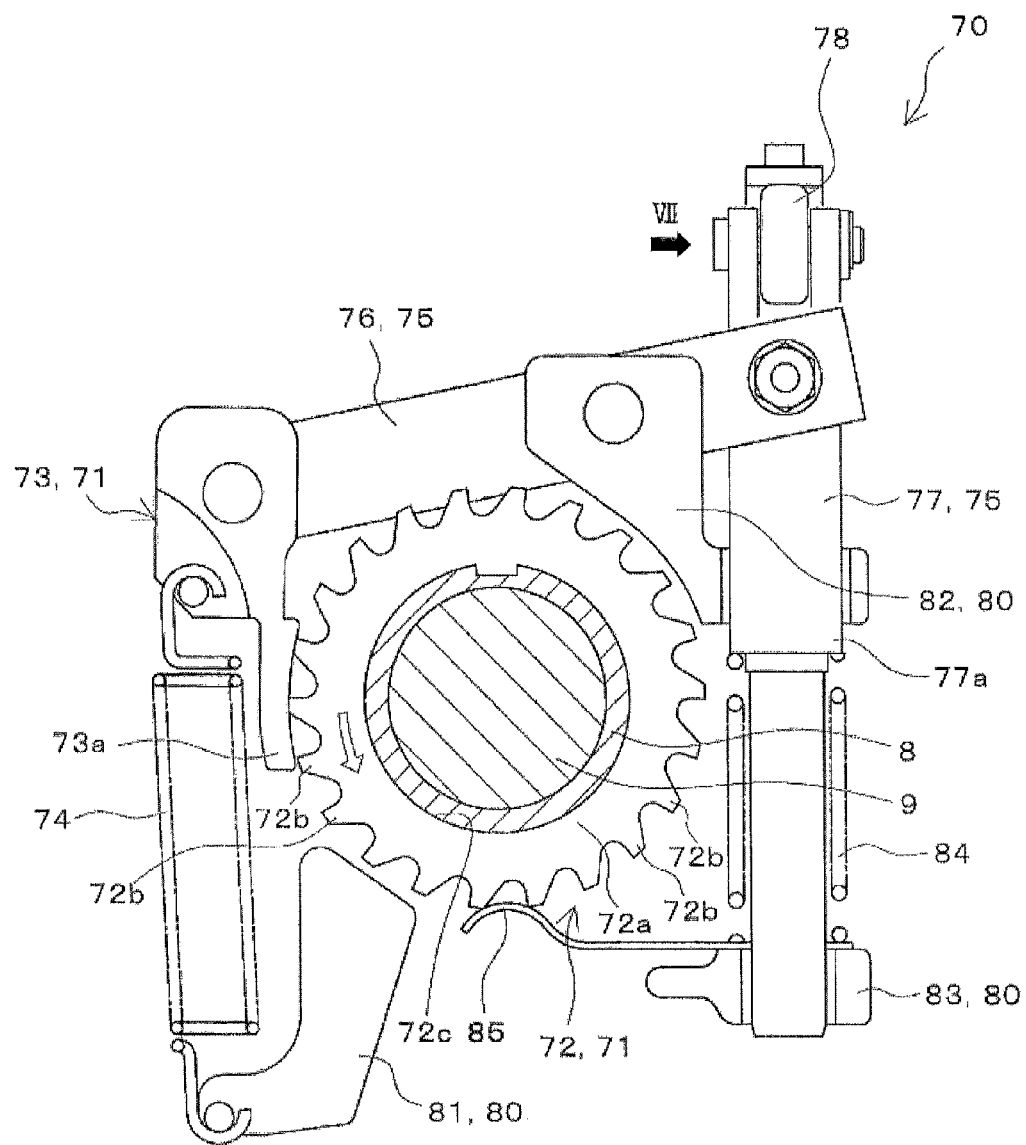
FIG. 6 is a sectional view along the VI-VI line in FIG. 3 for describing the arrangement of a gap adjusting mechanism.
Figure 7:
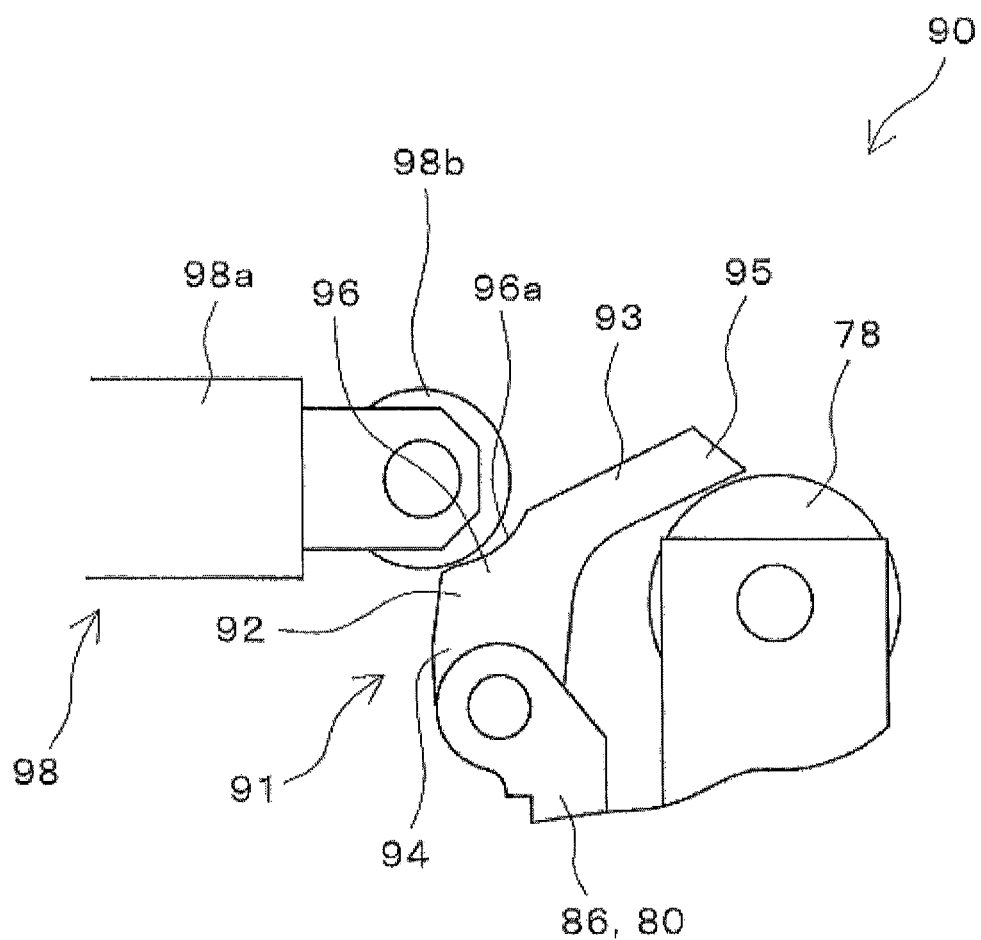
FIG. 7 is viewed from the arrow VII in FIG. 6 for describing the configuration of a link pressing mechanism.

FIG. 6 shows the gap adjusting mechanism 70. FIG. 7 is viewed from the direction of the arrow VII in FIG. 6. The gap adjusting mechanism 70 may include a ratchet mechanism 71, a tension spring 74 (biasing section), a link mechanism 75, a pressed section 78, a link mechanism retainer 80, and a link pressing mechanism 90. The gap adjusting mechanism 70 may be provided so as to surround the outer circumference of the sleeve member 8.

The ratchet mechanism 71 may include a ratchet gear 72 and a ratchet pawl 73.

The ratchet gear 72 may include a disc 72a, and a plurality of teeth 72b arranged circularly on the periphery of the disc 72a; and these members may be integrated together into a single structure or member. A through-hole 72c may be formed in the central portion of the disc 72a. The sleeve member 8 may be inserted through the through-hole 72c. The ratchet gear 72 and the sleeve member 8 may be fixed on each other by key coupling.

The ratchet gear 72 may be allowed to rotate in one direction (e.g., in the direction indicated by the white arrow in FIG. 6) by the ratchet pawl 73. More specifically, when the ratchet gear 72 is pressed by the ratchet pawl 73 engaged with the teeth 72 of the ratchet gear 72, the ratchet gear 72 may rotate in such a direction that the sleeve member 8 moves in the withdrawal direction B with respect to the push-rod 9.

The ratchet pawl 73 may be positioned outside the ratchet gear 72 with one end (the rear end) thereof connected to one end of the link mechanism 75 so as to be swingable. The other end (the front end) of the ratchet pawl 73 may be an engagement section 73a that can be engaged with the teeth 72b.

The link mechanism retainer 80 may retain the link mechanism 75 so as to be swingable. The link mechanism retainer 80 may be formed in, e.g., a ring shape surrounding the outer circumference of the sleeve member 8 and may be mounted on the sleeve member 8 via a sleeve bearing (not shown). The link mechanism retainer 80 may be restricted from moving in the front-rear direction with respect to the sleeve member 8 but allowed to rotate with respect to the sleeve member 8. More specifically, the link mechanism retainer 80 can be displaced in the front-rear direction along with the sleeve member 8 but may be prohibited from rotating with respect to the housing 3.

One end of the tension spring 74 may be mounted on the first support section 81 formed in the link mechanism retainer 80, and the other end thereof may be mounted on the ratchet pawl 73. The tension spring 74 may bias the ratchet pawl 73 along the direction indicated by the white arrow in FIG. 6.

The link mechanism 75 may include two link members (a first link member 76 and a second link member 77). The link members 76, 77 may have a substantially rod-like shape.

One end of the first link member 76 may be connected to one end (the rear end) of the ratchet pawl 73 so as to be swingable, and the other end the first link member 76 may be connected to one end of the second link member 77 so as to be swingable. The first link member 76 may be supported, at a portion other than both ends, by a second support section 82 formed in the link mechanism retainer 80 so as to be swingable.

One end of the second link member 77 may be connected to the other end of the first link member 76 so as to be swingable, and the other end of the second link member 77 may be inserted through a ring 83 formed in the link mechanism retainer 80. A coil spring 84 may be provided between the step 77a formed in the second link member 77 and the ring 83. Thus, the second link member 77 may be biased by the coil spring 84 from the other end of the second link member 77 to the one end thereof. Further, a tooth holding section 85 may be fixed on the ring 83. The tooth holding section 85 may prevent the ratchet gear 72 from rotating freely.

The pressed section 78 may be pressed by the link pressing mechanism 90 (described later). The pressed section 78 may be constituted by a roller-like member rotatably connected to the one end of the second link member.

The link pressing mechanism 90 may press the pressed section 78 so as to press the second link member 77 of the link mechanism 75. As shown in FIG. 7, the link pressing mechanism 90 may include a lever member 91 and a lever pressing section 98.

The lever member 91 may be provided near the pressed section 78 and may press the pressed section 78 when pressed by the lever pressing section 98. The lever member 91 may include a first portion 92 extending from the proximal end, and a second portion 93 bent at the distal end of the first portion 92 and extending toward the pressed section 78. These first and second portions are integrated together together into a single structure or member. The proximal end of the lever member 91 may serve as a fulcrum 94 and may be connected to a fulcrum supporting section 86 formed in the link mechanism retainer 80 so as to be swingable. Further, the distal end portion of the lever member 91 (the portion opposite to the proximal end with respect to the direction in which the lever member 91 extends) may serve as a working portion 95 for pressing the pressed section 78. The bent portion between the first portion 92 and the second portion 93 may serve as an application portion 96. The application portion 96 may include a recess 96a.

The lever pressing section 98 may include a base 98a and a roller 98b. The base 98a may have a substantially columnar shape. As shown in FIG. 4, the base 98a may be fixed on the front wall of the third housing section 6 so as to extend from the front side to the rear side in the third housing section 6. The roller 98b may be rotatably connected to the distal end of the base 98a (the rear end of the base 98a).

(Operation of Fluid Brake Mechanism)

The basic operation of the fluid brake mechanism 30 and the parking spring brake mechanism 40 will now be described below. First, the basic operation of the fluid brake mechanism 30 will be described.

FIG. 3 shows a disc brake device 1 and the brake cylinder device 2 wherein the fluid brake mechanism 30 and the parking spring brake mechanism 40 are not operating and are released. For example, FIG. 3 shows the state where the railway vehicle is running and no brake operation is performed. In this state, the compressed air may not be supplied to the second pressure chamber S21 via the second supply/exhaust port 36. The compressed air in the second pressure chamber S21 may be exhausted via the second supply/exhaust port 36 naturally. Thus, in the second cylinder section 31, the second piston 33 may be moved in the brake releasing direction D by the second spring 34.

In the state shown in FIG. 3, the compressed air may be supplied to the first pressure chamber S11 via the first supply/exhaust port 46. Thus, the first piston 43 may be moved in the brake releasing direction D against the biasing force of the first spring 44 due to the biasing force produced by the compressed air supplied into the first pressure chamber S11. In this state, the indentation teeth 62a of the clutch wheel 62 may not mesh with the indentation teeth 63a of the clutch sleeve 63, and there is a gap between them.

When the compressed air is supplied into the second pressure chamber S21 via the second supply/exhaust port 36, the fluid brake mechanism 30 may operate. The second piston 33 may be moved in the braking direction C against the biasing force of the second spring 34 due to the biasing force produced by the compressed air supplied into the second pressure chamber S21. Thus, the brake force transmitting section 37 may be moved in the braking direction C along with the second piston 33. Since the brake output section 7 may be gradually pressed by the inclined surface 38 of the brake force transmitting section 37 via the movable roller 25 and biased toward the advancement direction A, the brake output section 7 may be moved in the advancement direction A. As a result, the pair of brake pads 13 may move close to each other to nip and retain the brake disc 101. Thus, the rotation of the wheel may be braked.

(Operation of Parking Spring Brake Mechanism)

Next, the operation of the parking spring brake mechanism 40 will be described. The parking spring brake mechanism 40 may be used after the fluid brake mechanism 30 operates to stop the railway vehicle completely. The parking spring brake mechanism 40 may operate while the fluid brake mechanism 30 is operating. That is, the parking spring brake mechanism 40 may start operating in the state where the compressed air is supplied into the second pressure chamber S21 to bias the second piston 33 in the braking direction C.

The parking spring brake mechanism 40 may operate when the compressed air is exhausted from the first pressure chamber S11 via the first supply/exhaust port 46. When the compressed air supplied into the first pressure chamber S11 is exhausted through the first supply/exhaust port 46, the first piston 43 may be moved in the braking direction C due to the biasing force of the first spring 44. When the first piston 43 is moved in the braking direction C, the clutch sleeve 63 may be moved in the braking direction C along with the first piston 43. Then, the clutch sleeve 63 may contact the clutch wheel 62, and the indentation teeth 62a of the clutch wheel 62 may mesh with the indentation teeth 63a of the clutch sleeve 63.

In this state, the engagement blade 66a of the latch member 66 may be engaged with the latch blade 64a of the clutch box 64, such that the rotation of the clutch box 64 relative to the housing 3 may be restricted. Further, the rotation of the clutch sleeve 63 relative to the clutch box 64 may be restricted. Therefore, when the indentation teeth 62a mesh with the indentation teeth 63a, the rotation of the clutch wheel 62 relative to the housing 3 may be restricted via the clutch box 64 and the clutch sleeve 63. Thus, the rotation of the clutch wheel 62 may be stopped, and the spindle 51 and the first piston 43 may be connected together. In this state, the locking mechanism 65 may lock the parking spring brake mechanism 40 which remains operating. The rotation of the wheel may be kept braked; that is, the parking spring brake mechanism 40 may be kept operating. Once the parking spring brake mechanism 40 is operated, the compressed air may not be supplied to the second pressure chamber S21, and the compressed air may be gradually exhausted from the second pressure chamber S21.

(Operation of Gap Adjusting Mechanism)

Figure 8A:
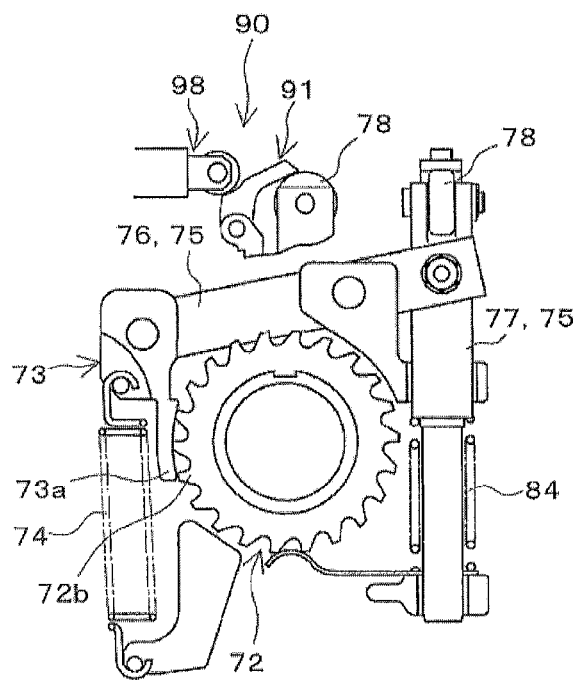
FIGS. 8A and 8B show the operation of the gap adjusting mechanism shown in FIG. 6 under the condition that a pad gap is within a normal range.
Figure 8B:
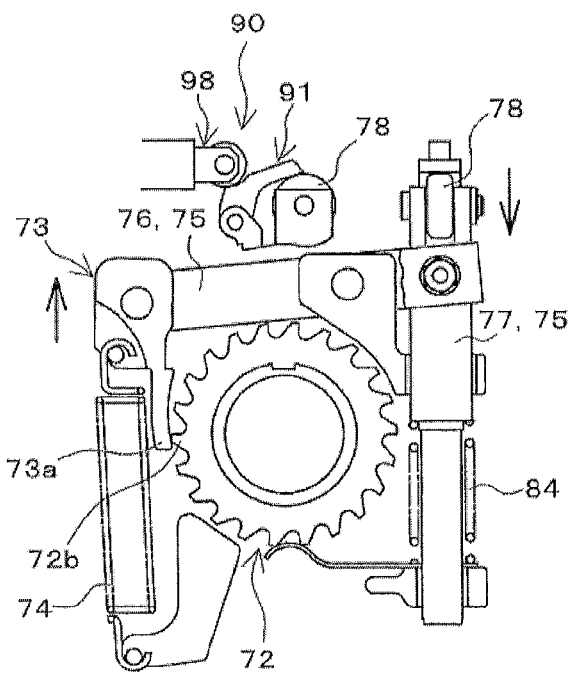
Figure 9A:
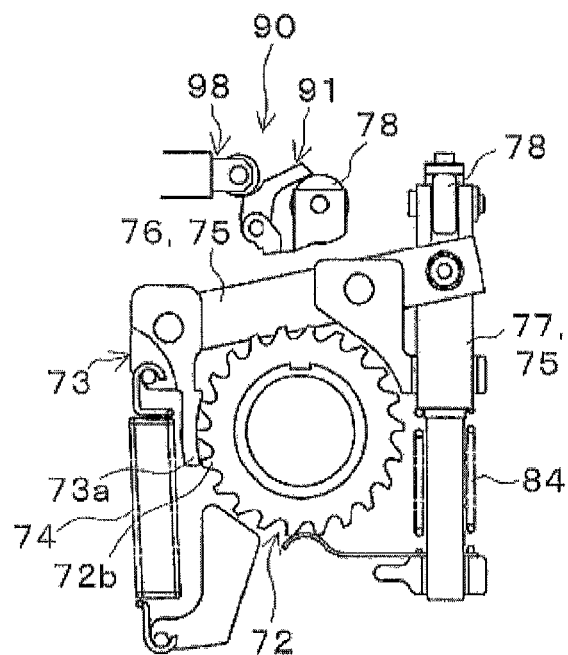
FIGS. 9A to 9C show the operation of the gap adjusting mechanism shown in FIG. 6 under the condition that a pad gap is outside a normal range.
Figure 9B:
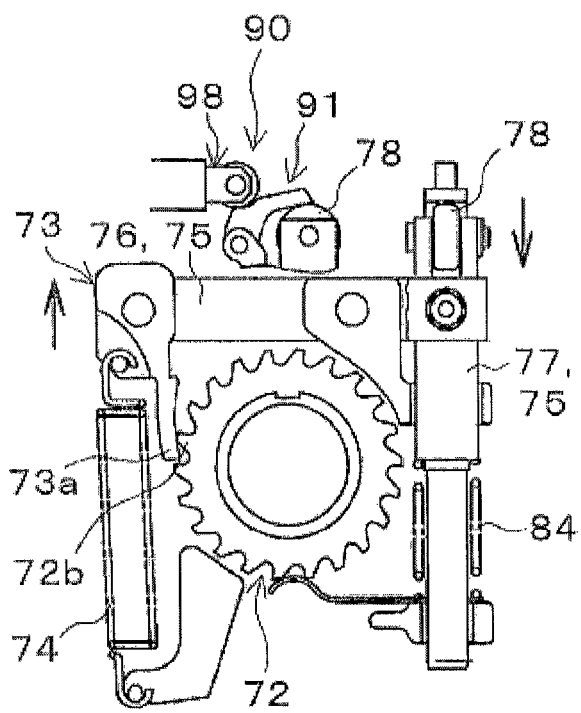
Figure 9C:
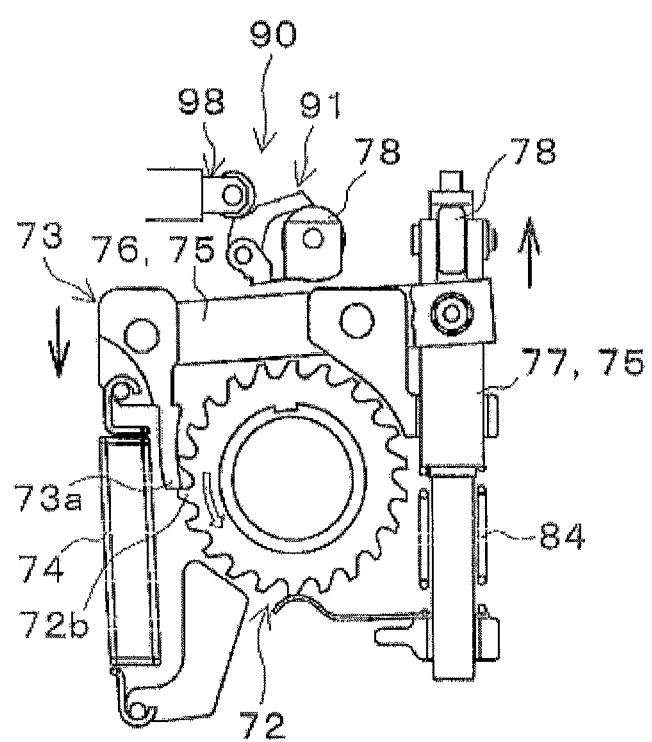

Next, the operation of the gap adjusting mechanism 70 will now be described. FIGS. 8A, 8B, 9A, 9B, and 9C explain the operation of the gap adjusting mechanism 70, wherein FIGS. 8A and 8B show the case where the pad gaps are within a normal range, and FIGS. 9A, 9B, and 9C show the case where the pad gaps are outside the normal range.

When the pad gaps are within the normal range, the operation of the gap adjusting mechanism 70 shown in FIGS. 8A and 8B is as follows. When the brake cylinder device 2 is in the released state (when none of the fluid brake mechanism 30 and the parking spring brake mechanism 40 is operating), the gap adjusting mechanism 70 may be in the state shown in FIG. 8A. More specifically, the brake output section 7 may be positioned on the withdrawal direction B side, and thus the pressed section 78 and the lever member 91 may also be positioned on the withdrawal direction B side. Therefore, as shown in FIG. 8A, the pressed section 78 may not be pressed by the link pressing mechanism 90. In this state, the second link member 77 may be pushed up in the upward direction by the coil spring 84 and the tension spring 74, such that the first link member 76 may press the ratchet pawl 73 in the downward direction. The engagement section 73a of the ratchet pawl 73 may not be engaged with the teeth 72b of the ratchet gear 72.

In the state shown in FIG. 8A, when the fluid brake mechanism 30 or the parking spring brake mechanism 40 operates, the brake output section 7 may be positioned on the advancement direction A side. The lever member 91 and the pressed section 78 may be moved in the advancement direction A along with the sleeve member 8 of the brake output section 7, and the lever member 91 may be pressed by the lever pressing section 98, such that the lever member 91 may press the pressed section 78. Thus, the second link member 77 may be pushed up in the downward direction against the biasing force of the coil spring 84 and the tension spring 74, such that the first link member 76 may pull up the ratchet pawl 73 in the upward direction (see FIG. 8B).

FIGS. 8A and 8B show the case where the pad gaps are within the normal range and are relatively small; therefore, the ratchet pawl 73 may be pulled by the link mechanism 75 for a relatively small distance. As a result, the engagement section 73a of the ratchet pawl 73 may slide on the ends of the teeth 72b of the ratchet gear 72, instead of being engaged with the teeth 72b (see FIG. 8B). Accordingly, even after returning to the released state (shown in FIG. 8A) from the state shown in FIG. 8B, the ratchet gear 72 may not rotate, and thus the pad gaps may not be varied.

When the pad gaps are outside the normal range (that is, when the pad gaps are large), the operation of the gap adjusting mechanism 70 shown in FIGS. 9A to 9C is as follows. When the brake cylinder device 2 is in the released state (when none of the fluid brake mechanism 30 and the parking spring brake mechanism 40 is operating), the gap adjusting mechanism 70 may be in the state shown in FIG. 9A. This state is the same as shown in FIG. 8A. That is, the pressed section 78 may not be pressed by the link pressing mechanism 90, and the engagement section 73a of the ratchet pawl 73 may not be engaged with the teeth 72b of the ratchet gear 72.

In the state shown in FIG. 9A, when the fluid brake mechanism 30 or the parking spring brake mechanism 40 operates, the brake output section 7 may be positioned on the advancement direction A side. The lever member 91 and the pressed section 78 may be moved in the advancement direction A along with the sleeve member 8 of the brake output section 7, and the lever member 91 may be pressed by the lever pressing section 98, such that the lever member 91 may press the pressed section 78. Thus, the second link member 77 may be pushed up in the downward direction in FIGS. 8A and 8B, such that the first link member 76 may pull up the ratchet pawl 73 in the upward direction.

FIGS. 9A to 9C show the case where the pad gaps are outside the normal range and are relatively large; therefore, the ratchet pawl 73 may be pulled up by the link mechanism 75 for a relatively large distance. Therefore, as opposed to the case shown in FIGS. 8A and 8B, the end of the engagement section 73a of the ratchet pawl 73 may be pulled up to the position where it faces the teeth 72b of the ratchet gear 72 (see FIG. 9B).

In the course of returning from the state shown in FIG. 9B to the released state, the link pressing mechanism 90 may cease from pressing the pressed section 78, and the ratchet pawl 73 may be pulled by the tension spring 74 in the downward direction. Thus, the ratchet gear 72 may rotate in the direction of the white arrow in FIG. 9C, and the sleeve member 8 may be moved in the withdrawal direction B with respect to the push-rod 9. That is, the push-rod 9 may be projected with respect to the sleeve member 8 for a large distance toward the advancement direction A, and thus the pad gaps become smaller.

(Shape of Inclined Surface of Brake Force Transmitting Section)

There is a demand in the market for a parking spring brake that provides a large brake force. More specifically, railway vehicles having a large weight and railway vehicles parked on an inclined surface require a large parking spring brake force.

A possible way to increase a parking spring brake force is to change the substance or the diameter of the spring for increasing the spring force. However, there is a limit in increasing the spring force by such design changes. To obtain a desired brake force, it may be necessary to increase the size of the parking spring brake mechanism. This may cause problems such as increase in the size of the brake cylinder device or significant increase in costs.

In contrast, in the brake cylinder device 2 according to this embodiment, the inclined surface 38 in the brake force transmitting section 37 for pressing the brake output section 7 may be constituted by a plurality of inclined surfaces. More specifically, the brake force transmitting section 37 may include in the distal end side thereof a first inclined surface 38a having a small inclination angle with respect to the advancement direction A of the brake output section 7, and also include in the proximal end side thereof a second inclination surface 38b having a large inclination angle with respect to the advancement direction A.

As described above, when the fluid brake mechanism 30 starts operating, the first inclined surface 38a may press the brake output section 7. Then, the second inclined surface 38b may press the brake output section 7.

As described above, the second inclined surface 38b may have a larger inclination angle with respect to the advancement direction A of the brake output section 7 than the first inclination surface 38a. Therefore, while the first inclined surface 38a presses the brake output section 7 (that is, before the brake pads 13 nip the brake disc 101), the traveling distance of the brake output section 7 in the advancement direction A may be large relative to the traveling distance of the brake force transmitting section 37 in the braking direction C.

In this embodiment, the pad gaps may be set at such a width that while the second inclined surface 38b presses the brake output section 7, the brake pads 13 nip the brake disc 101. Accordingly, as the inclination angle of the second inclined surface 38b with respect to the advancement direction A is larger (in other words, as the angle of the second inclined surface 38b with respect to the advancement direction A approaches 90 degrees), the spring brake force becomes larger.

That is, as in the brake cylinder device 2, the first inclined surface 38a having a smaller inclination angle may be provided in the distal end side of the brake force transmitting section 37 so as to enlarge the traveling distance of the brake output section 7 in the advancement direction A before the brake force is produced. Additionally, the second inclined surface 38b having a larger inclination angle than the first inclined surface 38a may be provided in the proximal end side so as to produce a large brake force.

(Cylinder Liner)

In the brake force transmitting section 37, as the inclination angle of the inclined surface (the second inclined surface 38b) for producing the brake force is larger, the brake force produced by the fluid brake mechanism may become larger in addition to the brake force produced by the parking spring brake mechanism. However, it is expected that there is a demand to maintain the brake force of the fluid brake at the conventional level in view of the pneumatic control of the compressed air.

In the brake cylinder device 2 according to this embodiment, a cylinder liner 32 having a cylindrical shape may be contained in the second cylinder section 31 of the fluid brake mechanism 30. That is, in the brake cylinder device 2, the cylinder of the fluid brake mechanism 30 may have a substantially smaller bore diameter. Thus, the second piston 33 of the fluid brake mechanism 30 may be acted on by a smaller force. Therefore, the brake force produced by the fluid brake mechanism 30 can be maintained at the conventional level without changing the control of the compressed air for controlling the fluid brake mechanism 30.

That is, in the brake cylinder device 2, the brake force produced by the parking spring brake mechanism 40 can be made larger while maintaining the brake force produced by the fluid brake mechanism 30 at the conventional level without making as major a design modification or air pressure control modification as was conventionally done.

(Effects)

As described above, in the brake cylinder device 2 according to this embodiment, the brake force transmitting section 37 may move in the braking direction C as the first piston 43 moves in the braking direction C. Simultaneously, the inclined portion 38 formed in the brake force transmitting section 37 may press the brake output section 7, and thus the brake output section 7 may be moved in the advancement direction A to produce a brake force.

In the brake cylinder device 2, the first inclined portion 38a having a smaller inclination angle with respect to the advancement direction A of the brake output section 7 may press the brake output section 7 when the brake force transmitting section 37 starts moving in the braking direction C. Thus, the traveling distance of the brake output section 7 in the advancement direction A may be made large relative to the traveling distance of the brake force transmitting section 37 in the braking direction C.

In the brake cylinder device 2, the second inclined portion 38b having a larger inclination angle than the first inclined portion 38a with respect to the advancement direction A of the brake output section 7 may press the brake output section 7 when the brake force is outputted to the object to be braked. Thus, the brake force outputted from the brake output section 7 can be made larger.

That is, in the brake cylinder device 2, a large brake force can be produced from the parking spring brake mechanism 40 by only changing the shape of the inclined portion 38 of the brake force transmitting section 37, unlike the conventional arts. To obtain a large brake force, there is no need of changing the substance or diameter of the spring and changing the shape of the cylinder in accordance with the design modification of the spring.

Accordingly, in the brake cylinder device 2, the brake force of the parking spring brake mechanism 40 can be made larger without increase in the size of the device or significant increase in costs.

In the brake cylinder device 2, the first inclined surface 38a and the second inclined surface 38b may be constituted by planar surfaces. Thus, the traveling distance of the brake output section 7 in the advancement direction A may be linear with the traveling distance of the brake force transmitting section 37 in the braking direction C. As a result, the pneumatic control for producing a desired brake force becomes simple.

In the brake cylinder device 2, the cylinder liner 32 having a cylindrical shape may be contained inside the second cylinder section 31 serving as a cylinder section of the fluid brake mechanism 30. Thus, the cylinder of the fluid brake mechanism 30 may have a substantially smaller bore diameter. Thus, the second piston 33 of the fluid brake mechanism 30 may be acted on by a smaller force. Therefore, the brake force produced by the fluid brake mechanism 30 can be maintained at the conventional level without changing the control of the pressurized fluid for controlling the fluid brake mechanism 30. Additionally, the cylinder liner 32 may be constituted by a member separate from the second cylinder section 31. As a result, the brake force of the fluid brake mechanism 30 can be maintained at the conventional level without changing the shapes of the components included in the conventional brake cylinder devices.

In the brake cylinder device 2, the pad gaps can be automatically adjusted. More specifically, in this arrangement, the brake output section 7 may be constituted by two members (e.g., the sleeve member 8 and the push-rod 9) capable of traveling relative to each other along the advancement direction A of the brake output section 7; and when the pad gaps become large, the push-rod 9 is advanced relative to the sleeve member 8 so as to reduce the pad gaps automatically.

More specifically, in the brake cylinder device 2, when the pad gaps become large, the brake output section 7 may be advanced largely in the advancement direction A, and thus the pressed section 78 provided in the link mechanism 75 may be pressed largely by the link pressing mechanism 90. When the pressed section 78 is pressed for a predetermined distance or more, the ratchet pawl 73 may travel in a direction opposite to the predetermined direction (e.g., in the direction of the white arrow in FIG. 6) and mesh with the teeth 72b of the ratchet gear 72 rotating integrally with the sleeve member 8.

Then, when the brake is released and the brake output section 7 travels in the withdrawal direction B, the link pressing mechanism 90 may cease to press the pressed section 78. Therefore, the ratchet pawl 73 may be biased by the tension spring 74 such that the ratchet gear 72 may be rotated in the predetermined direction (e.g., in the direction of the white arrow in FIG. 6). As a result, the push-rod 9 may travel in the advancement direction A relative to the sleeve member 8, reducing the pad gaps.

In the brake cylinder device 2, the link pressing mechanism 90 for pressing the pressed section 78 may be constituted by a lever mechanism. Thus, the pressed section 78 can be sufficiently displaced even when the traveling distance of the brake output section 7 achieved after the pressing section 98 contacts the application portion 96 of the lever member 91 is small. Thus, in the brake cylinder device 2, the pad gaps being slightly larger can be reduced.

Further, in the brake cylinder device 2, the roller 98b of the pressing section 98 may press the lever member 91 while the roller 98b is fitted in the recess 96a formed in the application portion 96; therefore, it can be ensured that the pressing section 98 presses the lever member 91.

Still further, in the brake cylinder device 2, the portion of the lever member 91 between the application portion 96 and the working portion 95 may be bent to the pressed section 78 side relative to the direction in which the portion of the lever member 91 between the fulcrum 94 and the application portion 96 extends. Thus, the force from the pressing section 98 acting on the application portion 96 can be transmitted to the pressed section 78 more efficiently.

Further, the disc brake device 1 may include the brake cylinder device 2 that can increase the brake force of the parking spring brake mechanism 40 without increase in the size of the device or significant increase in costs. Accordingly, a disc brake device that is cost effective and compact can be provided.

Although the embodiments of the present disclosure have been described above, the present disclosure is not restricted to the above-described embodiments, and various modifications are possible within the scope of the claims. For example, the following exemplary variation is possible.

Figure 10:
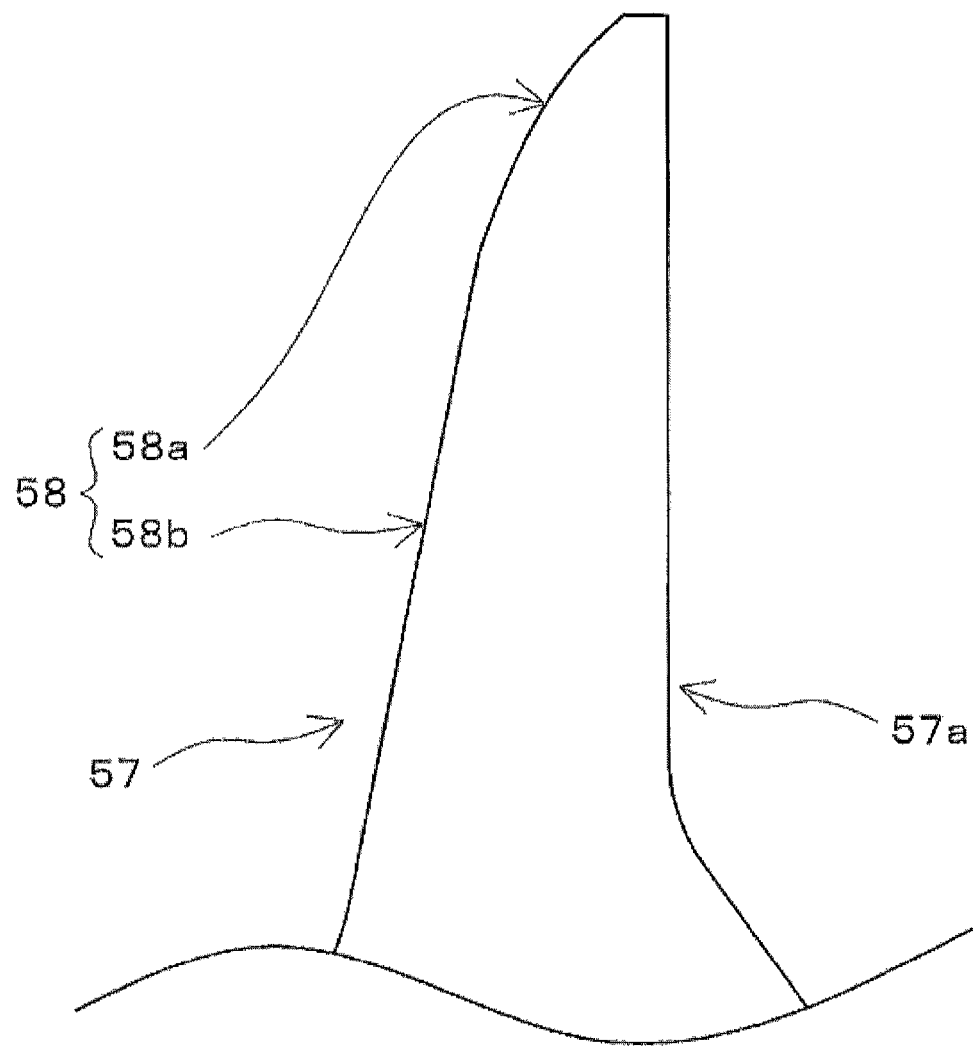
FIG. 10 is a plain view of a brake force transmitting section of the brake cylinder device according to an exemplary variation.

(1) FIG. 10 is a plain view of a brake force transmitting section 57 of the brake cylinder device according to the exemplary variation. The inclined surface 58 of the brake force transmitting section 57 of this exemplary variation may include, in the proximal end portion thereof, a second inclined surface 58b constituted by a plain surface, as in the above-described embodiment. However, the inclined surface 58 may include, in the distal end portion thereof, a first inclined surface 58a constituted by a curved surface, unlike the above-described embodiment. This embodiment can also produce the same effect as the above-described embodiment.

(2) The inclined surface 38 may be formed of three or more inclined surfaces, unlike the above-described embodiment wherein the inclined surface 38 may be formed of two inclined surfaces 38a, 38b.

(3) In the above-described embodiment, it is not essential that the cylinder liner 32 is provided in the second cylinder section 31 so as to substantially reduce the bore diameter of the cylinder of the fluid brake mechanism 30 and control the compressed air pressure as in the conventional arts. More specifically, the compressed air pressure may be controlled in a different manner than in the conventional arts without using the cylinder liner 32, so as to control the brake force of the fluid brake mechanism 30.

INDUSTRIAL APPLICABILITY

The present disclosure can be applied to a brake cylinder device in which a parking spring brake mechanism used for parking a railway vehicle can operate.

LIST OF REFERENCE NUMBERS 1 disc brake device
2 brake cylinder device
7 brake output section
37 brake force transmitting section
38 inclined surface
38a first inclined surface
38b second inclined surface
40 parking spring brake mechanism
41 first cylinder section
43 first piston
44 first spring
S11 first pressure chamber

What is claimed is:
1. A brake cylinder device comprising:
a parking spring brake mechanism for parking a vehicle, wherein a first piston installed in a first cylinder section travels in a predetermined braking direction due to a biasing force of a first spring installed in the first cylinder section;
a brake output section capable of advancing and withdrawing along a direction intersecting the braking direction;
a brake force transmitting section having an inclined surface inclined so as to press the brake output section in an advancement direction by traveling in the braking direction along with the first piston,
wherein the inclined surface includes a first inclined surface provided in a distal end portion of the brake force transmitting section, and a second inclined surface provided in a proximal end portion of the brake force transmitting section and inclined more than the first inclined surface with respect to the advancement direction, and
a fluid brake mechanism including:

a second cylinder section having a first bore diameter;

an internal cylinder member formed of a member separate from the second cylinder section and contained in the second cylinder section to have an inner circumferential surface of the fluid brake mechanism, the internal cylinder member having a second bore diameter that is smaller than the first bore diameter; and a second piston coupled to the brake force transmitting section and configured to slide on the inner circumferential surface of the internal cylinder member in the second cylinder section and travel in the braking direction.

2. The brake cylinder device of claim 1, wherein the first inclined surface and the second inclined surface are constituted by planar surfaces.

3. The brake cylinder device of claim 1, further comprising:

a transmission mechanism configured to transmit a biasing force of the first piston in the braking direction to the second piston or a shaft section to be displaced along with the second piston.

4. The brake cylinder device of claim 1, wherein the brake output section includes:

a sleeve member formed of a cylindrical member having an axis along the advancement direction; and a shaft member configured to travel in the advancement direction relative to the sleeve member when the sleeve member is rotated in a predetermined direction, and wherein the brake cylinder device further comprises a gap adjusting mechanism including:

a ratchet mechanism having a ratchet gear configured to rotate integrally with the sleeve member and a ratchet pawl configured to mesh with teeth of the ratchet gear;

a link mechanism having a first link member connected to the ratchet pawl at one end thereof, wherein the ratchet pawl is configured to travel in a direction opposite to the predetermined direction and mesh with the teeth when a pressed section provided on the other end of the first link member or a second link member swingably connected to the other end of the first link member at one end thereof is pressed for a predetermined distance or more; and a link pressing mechanism configured to press the pressed section so as to move the ratchet pawl in a direction opposite to the predetermined direction.

5. The brake cylinder device of claim 4, wherein the link pressing mechanism includes:

a lever member formed so as to be swingable around a proximal end portion thereof, wherein an application portion between the proximal end portion and a distal end section is pressed such that the distal end portion presses the pressed section; and a pressing section provided on a member fixed on or integrated with the first cylinder section and configured to press the application portion traveling in accordance with the traveling of the brake output section in the advancement direction.

6. The brake cylinder device of claim 5, wherein the application portion has a recess into which the pressing section is to be fitted.

7. The brake cylinder device of claim 5, wherein a portion of the lever member between the application portion and the distal end portion is bent to the pressed section side relative to a direction in which a portion of the lever member between the proximal end portion and the application portion extends.

8. A disc brake device comprising:

the brake cylinder device of claim 1; and a caliper body equipped with the brake cylinder device and mounted on a vehicle, wherein, when the brake cylinder device operates, a pair of brake pads mounted on the caliper body nips a disc on a wheel axle to be braked, so as to produce a brake force.

* * * * *